J. WINKELMEYER.
COMBINED MEAT SLICER AND CUTTER.
APPLICATION FILED DEC. 24, 1908.
949,34*
Patented Feb. 15, 1910.
6 SHEETS—SHEET 2.
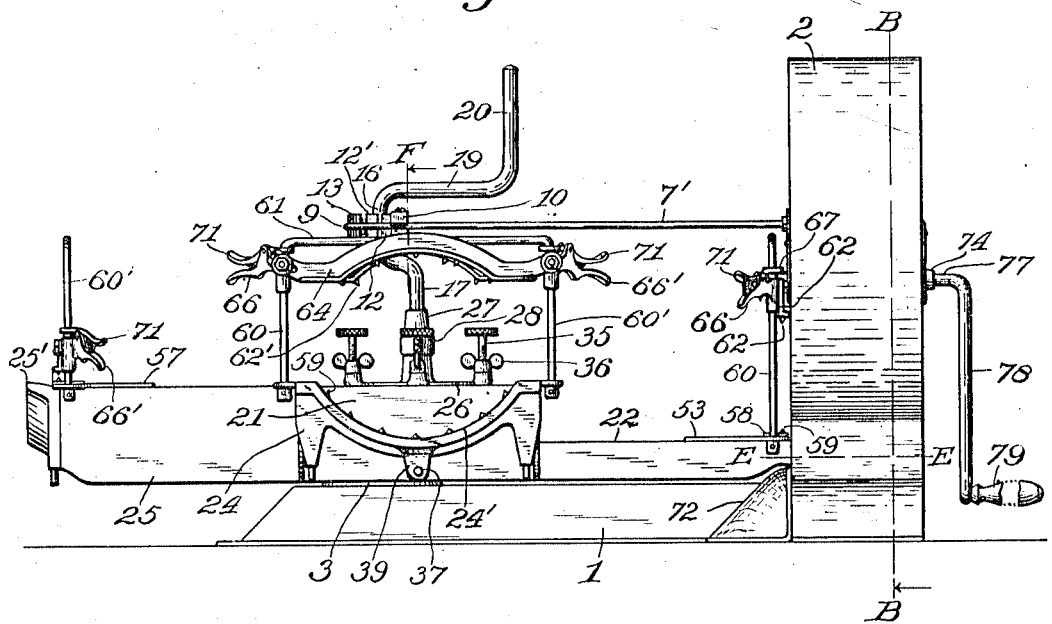
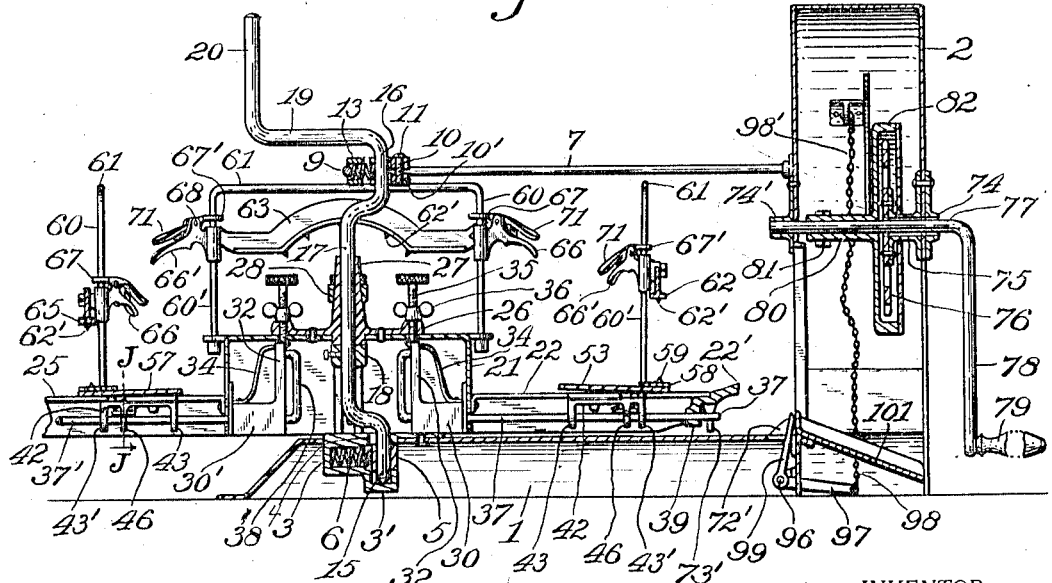
WITNESSES:
J. H. Gardner
K. R. Woddell
INVENTOR:
John Winkelmeyer,
BY
E. T. Silvius,
ATTORNEY.

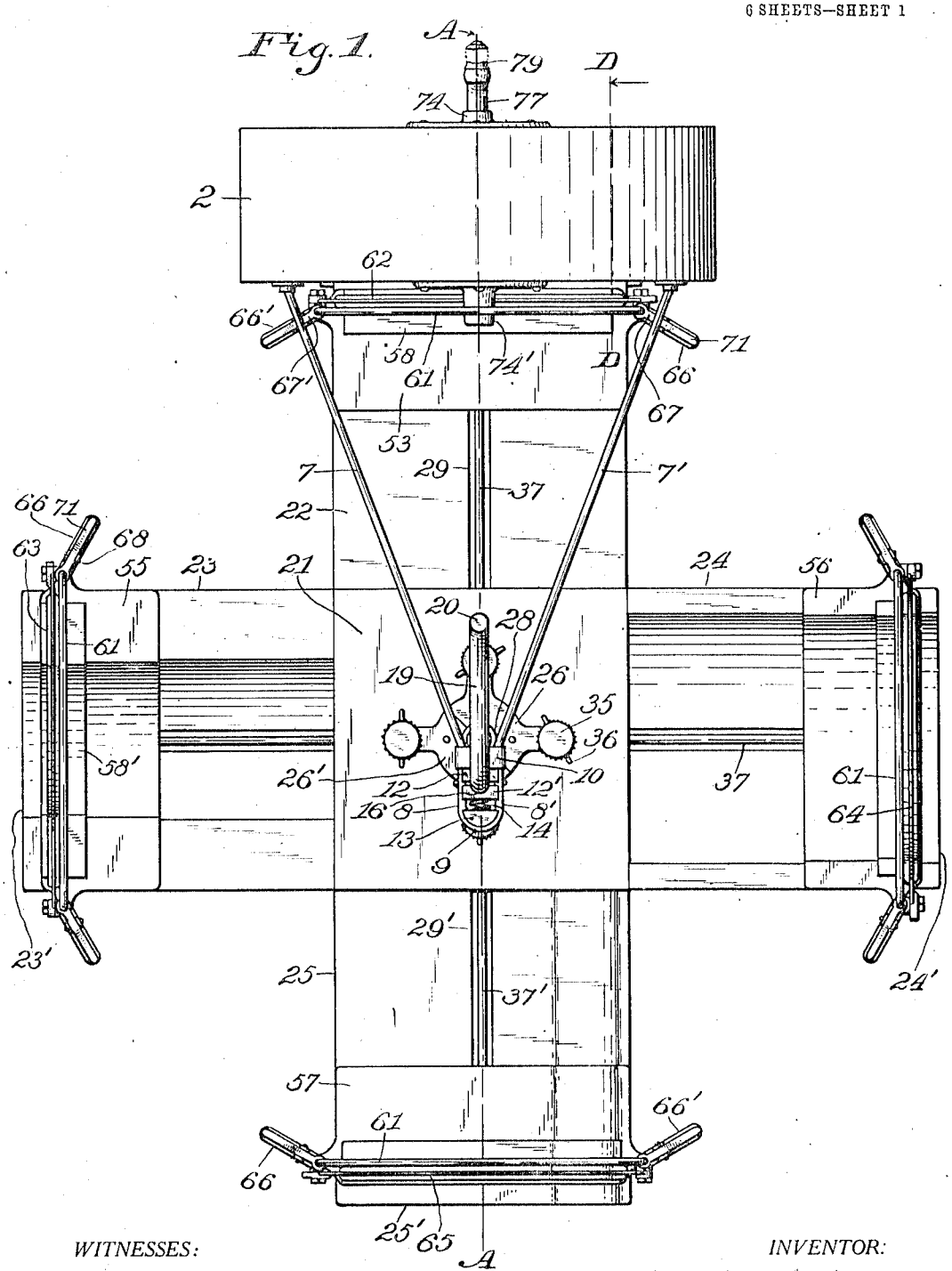

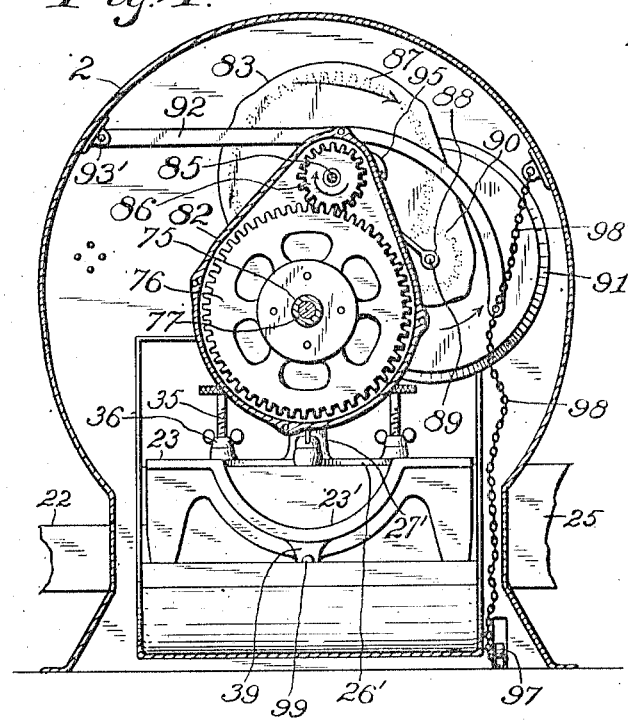
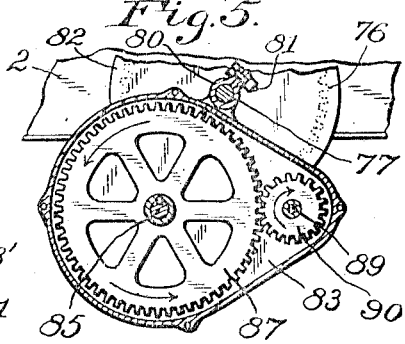
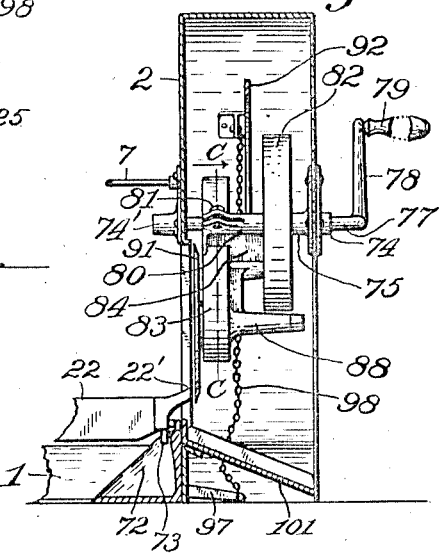
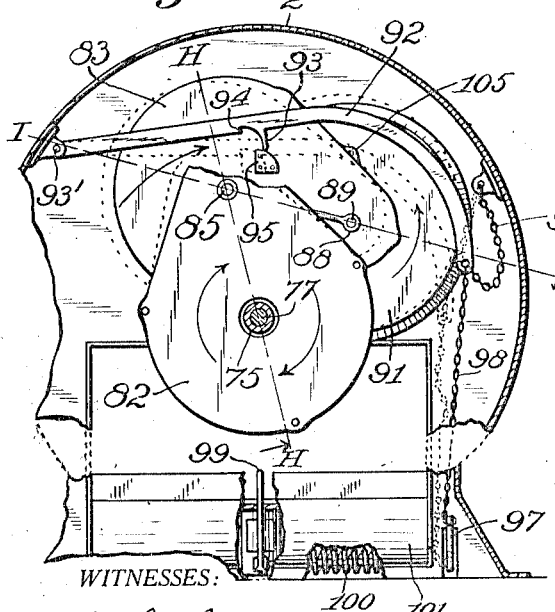
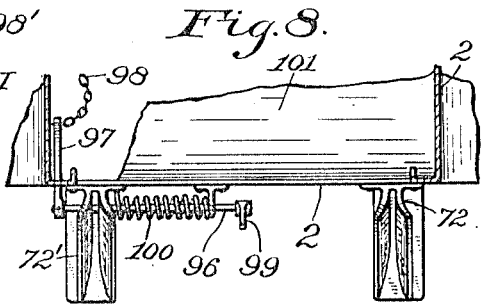

J. WINKELMEYER.
COMBINED MEAT SLICER AND CUTTER.
APPLICATION FILED DEC. 24, 1908.
949,344.
Patented Feb. 15, 1910.
6 SHEETS—SHEET 4.
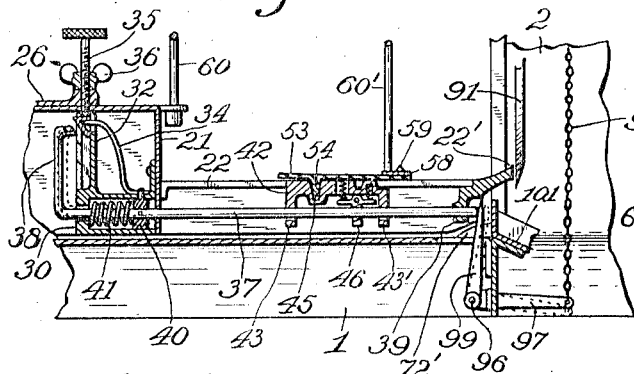
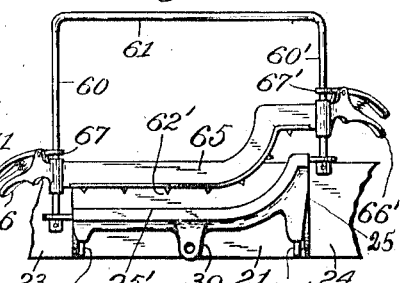
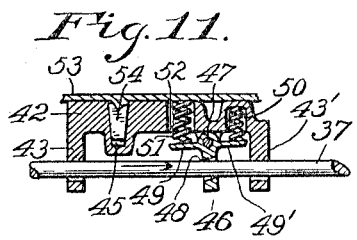
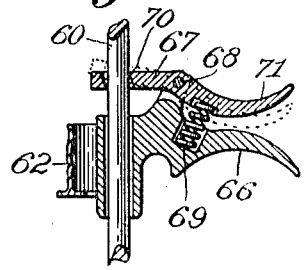
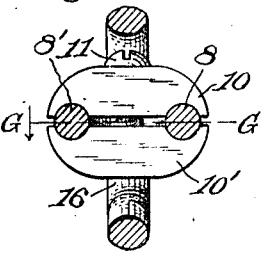
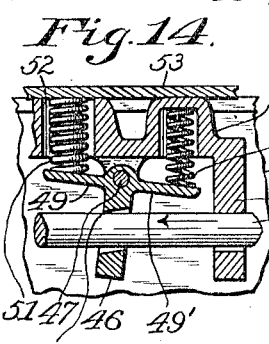
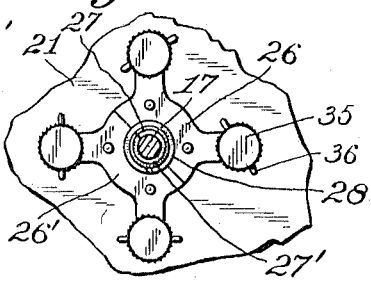
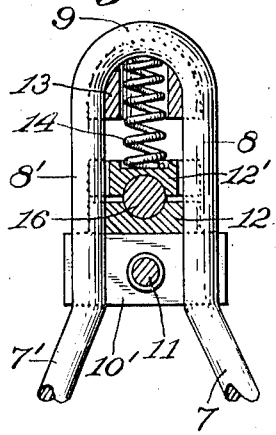
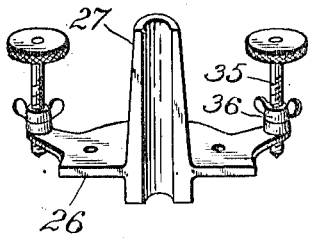
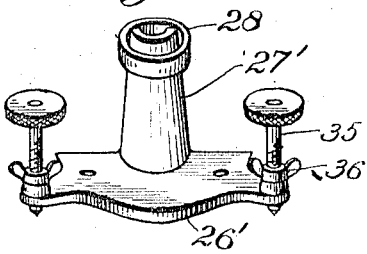
WITNESSES:
J. H. Gardner.
K. R. Woddell.
INVENTOR:
John Winkelmeyer,
BY
E. T. Silvius,
ATTORNEY.

J. WINKELMEYER.
COMBINED MEAT SLICER AND CUTTER.
APPLICATION FILED DEC. 24, 1908.
949,344.
Patented Feb. 15, 1910.
6 SHEETS—SHEET 5.
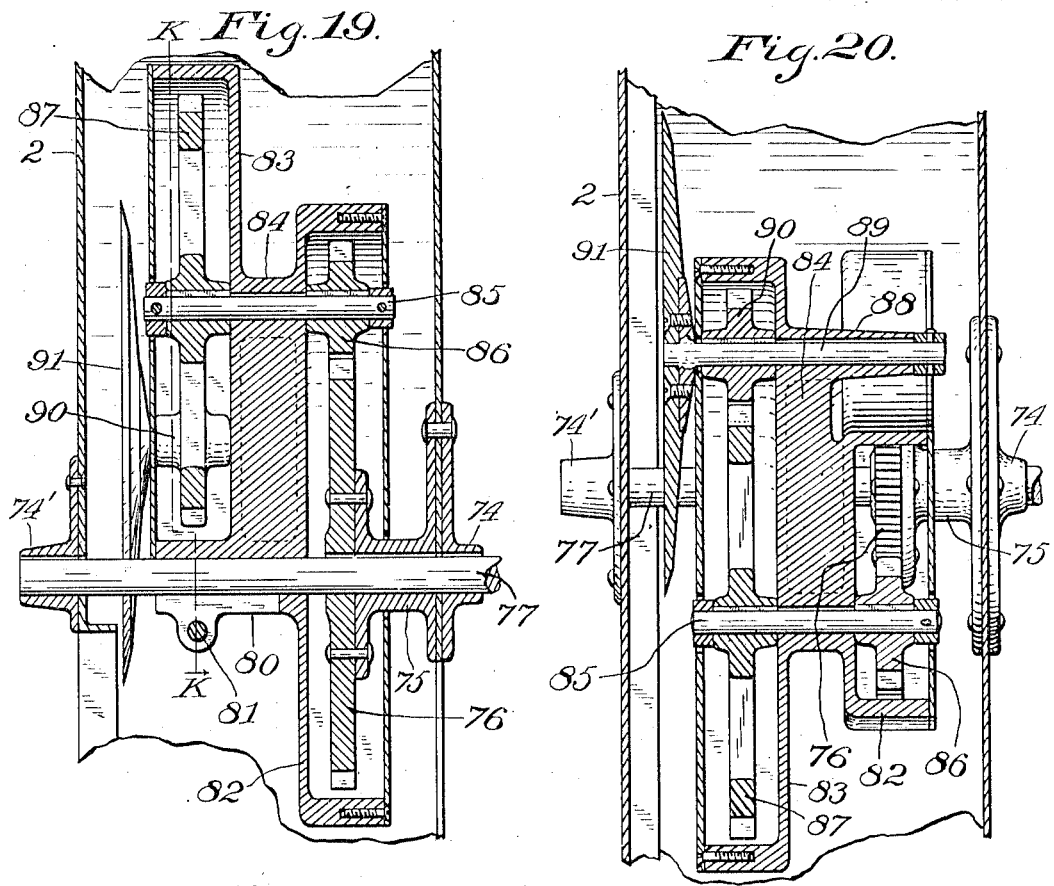
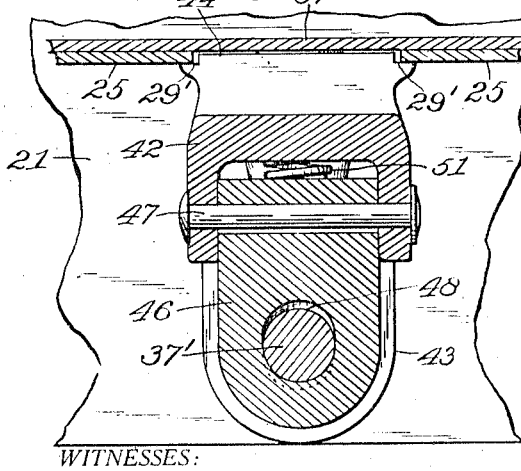
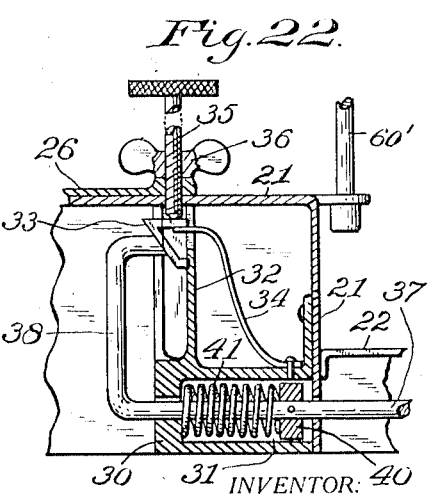
WITNESSES:
J. H. Gardner
K. R. Woddell
INVENTOR:
John Winkelmeyer,
BY
E. T. Silvius,
ATTORNEY.

J. WINKELMEYER.
COMBINED MEAT SLICER AND CUTTER.
APPLICATION FILED DEC. 24, 1908.
949,344.
Patented Feb. 15, 1910.
6 SHEETS—SHEET 6.
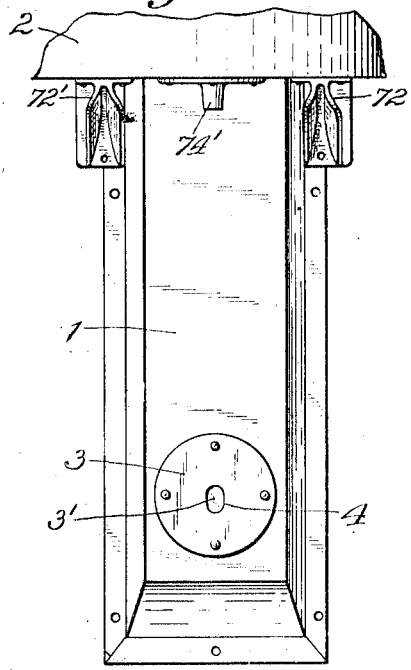
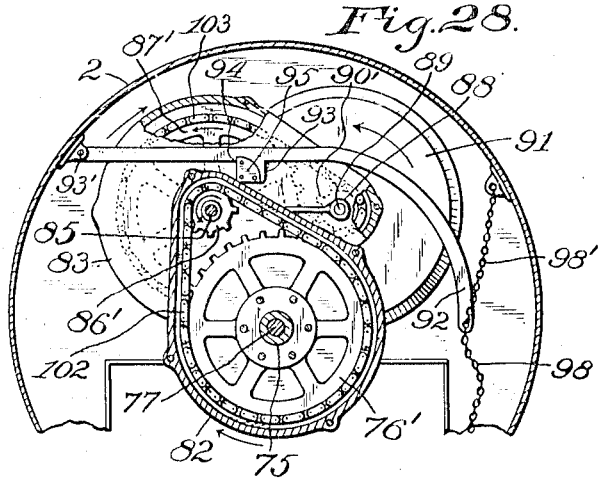
WITNESSES:
J. H. Gardner
K. R. Woddell
INVENTOR.
John Winkelmeyer,
BY
E. T. Silvius,
ATTORNEY.

UNITED STATES PATENT OFFICE.

JOHN WINKELMEYER, OF ANDERSON, INDIANA, ASSIGNOR OF ONE-HALF TO THOMAS S. GETTLE, OF ANDERSON, INDIANA.

COMBINED MEAT SLICER AND CUTTER.

949,344.    Specification of Letters Patent.    Patented Feb. 15, 1910.

Application filed December 24, 1908. Serial No. 469,125.

*To all whom it may concern:*

Be it known that I, JOHN WINKELMEYER, a citizen of the United States, residing at Anderson, in the county of Madison and State of Indiana, have invented certain new and useful Improvements in a Combined Meat Slicer and Cutter; and I do declare the following to be a full, clear, and exact description of the invention, reference being had to the accompanying drawings, and to the letters and figures of reference marked thereon, which form a part of this specification.

This invention relates to slicing and cutting machines that are designed to be used for dividing or cutting meat or other substances into thin slices or into relatively larger portions, the invention having reference particularly to a machine that is adapted to be used by retail merchants whereby to hold a number of kinds or different shapes of bulk meat or other substances from which it may be desired to cut slices or portions of various thicknesses.

Objects of the invention are to provide an improved slicing or cutting machine that will be adapted to be used by retail merchants or meat dealers for expeditiously retailing meats or similar articles to order; another object being to provide an improved slicer or cutter that will be adapted to hold a variety of kinds or shapes of meats or similar articles compactly and whereby the same may be sliced or divided into portions by the use of a single knife, so that working space may be saved and loss of time avoided; a still further object being to provide a machine for slicing meat uniformly and neatly, and to provide an improved and easily-operated high-speed cutting knife and operating mechanism therefor in machines of the above mentioned character.

The invention consists in an improved slicing and cutting machine comprising a movable cutting knife, a turn table having a plurality of meat holding and feeding apparatus thereon and rotative to move either one of a plurality of articles opposite to the plane of movement of the cutting knife; the invention consisting also in novel operating mechanism for the cutting knife, and consisting further in the parts and combinations and arrangements of parts, as hereinafter particularly described, and pointed out in the accompanying claims.

Referring to the drawings, Figure 1 is a top plan of the machine represented as being ready for use; Fig. 2, a side elevation of the machine; Fig. 3, a vertical longitudinal sectional view approximately on the plane of the line A A in Fig. 1; Fig. 4, a transverse sectional view approximately on the plane of the line B B in Fig. 2; Fig. 5, a fragmentary vertical sectional view on the plane of the line C C in Fig. 6 corresponding to the line K K in Fig. 19; Fig. 6, a fragmentary vertical longitudinal sectional view approximately on the plane of the line D D in Fig. 1; Fig. 7, a fragmentary transverse sectional view taken on a plane near the line B B in Fig. 2 or near the forward end of the machine; Fig. 8, a fragmentary horizontal sectional view on the line E E in Fig. 2; Fig. 9, a fragmentary vertical longitudinal sectional view on the line A A in Fig. 1; Fig. 10, a fragmentary end elevation of one of a plurality of meat holding and guiding devices; Fig. 11, a vertical longitudinal sectional view of one of the feed heads of the meat holding apparatus as at the plane of the line A A in Fig. 1; Fig. 12, a detail sectional view of one of the devices for locking the clamp-bars for holding the meat; Fig. 13, a fragmentary transverse vertical sectional view on the line F in Fig. 2; Fig. 14, a fragmentary sectional view showing parts illustrated in Fig. 11 in different positions; Fig. 15, a fragmentary sectional plan view showing the adjusting screws for varying the thickness of the slices to be cut; Fig. 16, a horizontal sectional view as at the plane of the line G G in Fig. 13; Figs. 17 and 18, perspective views of the two principal parts of the center bearing constituting the central portion of the turntable; Fig. 19, a fragmentary longitudinal sectional view on the plane of the line H H in Fig. 7; Fig. 20, a fragmentary longitudinal sectional view on the plane of the line I I in Fig. 7; Fig. 21, a fragmentary vertical sectional view as at the plane of the line J J in Fig. 3; Fig. 22, a fragmentary vertical sectional view as on the plane of the line A A in Fig. 1; Fig. 23, a fragmentary plan view showing the platform or base portion of the machine; Fig. 24, a top plan showing portions of the feed adjusting apparatus; Figs. 25, 26 and 27, details of apparatus for sharpening the cutting knife; Fig. 28, a fragmentary transverse vertical sectional view showing modifications in the apparatus for operating the cutting-knife taken as at a plane near the line B B in Fig. 2; and Fig. 29, a fragmentary transverse vertical sectional view showing a modified form of cutting-knife taken as at the plane of the line B B in Fig. 2.

Similar reference characters in the different figures of the drawings indicate corresponding elements or features of construction referred to herein.

The machine is illustrated as having four divisions or apparatus for holding four pieces or forms of meat or other substance, such as flat or rectangular pieces, boiled ham formed into cylinders, stuffed sausage or the like, or dried beef or bacon, and it is obvious that each or all of the divisions may be modified in shape as may be desired.

As preferably constructed the machine comprises a platform 1 and an upright hollow housing 2 connected rigidly with the platform and together constituting the main frame of the machine, the platform supporting the meat holding and guiding apparatus and the housing supporting the cutting apparatus. The end portion of the platform 1 remote from the housing 2 is provided with a shaft bearing housing 3 having a slot 4 in the top thereof and a bottom 3' below the slot, and a journal bearing 5 is mounted movably in the housing and is normally spring pressed toward the housing 2 by a spring 6 that is suitably arranged in the housing 3 in engagement with the journal bearing. A pair of frame members 7 and 7' are attached to the rear side of the housing 2 and extend convergently toward a point above the housing 3, portions of the members being formed into parallel guide-bars 8 and 8' that are connected at their ends by an integral loop 9 forming an abutment, an opposing abutment being composed of two cross-bars 10 and 10' secured to the guide-bars by a clamp bolt 11. A pair of journal bearings 12 and 12' are mounted between the guide bars 8 and 8', one of them being against the abutment bars 10 and 10'. A guide piece 13 is seated against the loop 9 and guides a spring 14 which is seated also against the loop and bears against the journal bearing 12'. A vertical shaft is provided that comprises two journal portions 15 and 16 in alinement and mounted rotatively in the journal box 5 and the journal bearings 12 and 12', the shaft having an offset cranked portion 17, the axis of which is at one side of the axis of the journal portions 15 and 16, and it has a bearing collar 18 suitably secured thereto, the portion 17 constituting a movable center post for the turn-table, and a crank arm 19 extends from the journal portion 16 and has an operating handle 20 formed thereon for rotating the shaft. The turn-table comprises a hollow center piece 21 which is preferably box shaped with vertical sides and a flat top, and the guides for guiding the several kinds of meat are preferably formed as four arms as 22, 23, 24, 25, attached to and extending radially and horizontally from the center piece 21, all the arms being substantially alike except as they may be slightly modified in their upper portions to conveniently accommodate various shapes of meat, the ends of the arms being provided with suitably shaped stationary shear-blades 22', 23', 24', 25', respectively. The top of the arm 22 is preferably flat as a table, the top of the arm 23 being concave as a trough as is also the arm 24 but somewhat broader in the groove, and the arm 25 is partially flat with one side thereof curved upwardly so as to be adapted to support relatively thin pieces of meat, such as flexible strips of bacon, in order that a cutting-knife may operate most advantageously on the meat.

The turn-table is provided with a center bearing which preferably is composed of two sections comprising plates 26 and 26' and integral journal bearing parts 27 and 27', respectively, the plates being secured to the top of the center piece 21 and resting for support on the bearing collar 18 of the center post, the journal parts 27 and 27' embracing the center post portion 17 of the shaft for rotatively guiding the turn-table in a horizontal plane, the two parts 27 and 27' being preferably secured rigidly together by a sleeve 28 driven tightly over the parts. The arms of the turn-table each have a guide-groove as 29 or 29' arranged centrally and longitudinally in the top thereof. The center-piece 21 has a suitable number of housings as 30 or 30' secured thereto, one for each arm of the turn-table and arranged at the inner ends of the arms, each housing having a chamber 31 therein and having also a vertical guide-bar 32 in which is mounted an adjustable wedge 33 that is normally pushed upward by a spring 34 against an adjusting screw 35 that is mounted in the plate of the center bearing of the turn-table and provided with a lock-nut 36, so that the position of the wedge may be readily adjusted vertically by manipulating the adjusting screw 35. Each arm of the turn table is provided with a feed bar 37 or 37' that extends horizontally through the housing 30 and has an up-turned arm on the inner end thereof suitably formed and normally engaging the wedge 33 whereby the feed bar is stopped in its feeding operations, the other end of the feed-bar being movably supported in a guide 39 under the end of the arm of the turn table. A collar 40 is secured to the feed bar within the chamber 31 and is engaged by a spring 41 that is arranged in the housing and seated therein so that the spring normally holds the feed-bar in the position permitted by the wedge 33. Each feed-bar as 37 has a feed-head 42 thereon that has bearing members 43 and 43' which are guided by the feed bar, the feed-head being partially guided also against the under side of the top of the arm as 22 and having a guide portion 44 (see Fig. 21,) that extends into and is guided in the guide slot as 29 or 29'. Each feed-head has a socket 45 in the top thereof and a grip arm 46 is connected by a pivot 47 to the under side of the feed-head and has a sharp edge part 48 adapted to bite the feed-bar 37 when in proper position, the grip arm having a pair of projections 49 and 49' thereon, one projection being engaged by a spring 50 that is seated in the under side of the feed-head, the other projection being engaged by a relatively stronger and longer spring 51 extending through an opening 52 in the feed-head.

A suitable number of pallets as 53 having a projection 54 on the under side thereof adapted to enter the socket 45, and other similar pallets as 55, 56, 57, are provided, one for each arm of the turn-table and suitably shaped to conform to the contours of the tops of the turn-table arms; and if desired duplicates of the pallets may be provided also in order that they may be attached to a larger number of pieces of bulk meat which may be expeditiously placed on the machine in exchange for other pieces of meat. The weight of the pallet and meat thereon normally presses the spring 51 down so that the feed-bar 37 is gripped by the grip arm 46 when the feed-bar is moved, as indicated by the arrow in Fig. 11, and when the feed-bar is moved in the reverse direction as indicated in Fig. 14 the grip arm 46 will be released to permit free movement of the feed-bar. If the pallet be lifted slightly by hand the spring 51 will rise so that the weaker spring 50 will tilt the grip arm 46 to a position permitting free movement of the feed-bar 37 and the feed head in either direction.

Each pallet has a reinforcing plate 58 on the outer end thereof that is provided with sharp projections 59 adapted to sink into the meat for holding it firmly, and each pallet is provided also at the outer end thereof with a pair of posts 60 and 60' that are integrally connected at the tops by a cross-bar 61, each pair of posts having a clamp-bar as 62 provided on the under side thereof with sharp projections 62' adapted to enter the meat, one of the clamp-bars being straight and the other clamp-bars as 63, 64, 65, being arched or otherwise shaped to conform to the desired shapes of the bulk meat. Each clamp bar has a pair of projecting handles 66 and 66' to which clutches 67 and 67' are connected by pivots 68, the clutches being engaged by springs 69 that normally force a sharp edge 70 of the clutch against the post 60 or 60' with which it may be associated, each clutch being provided with an operating handle 71 for releasing the clutch from the post and permitting the clamp bar to be raised from the meat.

The rear side of the housing 2 is provided with a pair of V-shaped guides 72 and 72' that extend along opposite sides of the platform 1, and each arm of the turn-table is provided at the end thereof with a pair of guide fingers 73 and 73' that are adapted to enter the V-shaped guides when either arm of the turn table is brought into position for slicing the meat that may be on such arm, so that the end of the arm will be accurately positioned and firmly supported during the slicing operations, the arm being moved toward or from the V-shaped guides by turning the handle 20 so as to shift the axis of the turn-table center post toward or from the housing 2, and either arm of the turn-table may be swung around so as to be opposite to the housing 32 or at the rear side thereof by rotation of the turn-table about its centerpost.

The housing 2 may be variously constructed and is designed to incase the cutting-knife and its operating gearing, and the forward and rearward sides of the housing are provided with journal bearings 74 and 74' respectively, the forward side of the housing having a hollow hub 75 secured thereto that has a suitable gear wheel 76 suitably attached thereto, so that the gear wheel is stationary or rigidly supported. A driving shaft 77 is mounted in the journal bearings 74 and 74', and extends through the hub and the gear wheel, the shaft having a crank arm 78 on the outer end thereof that has an operating handle 79. A hub 80 is suitably secured rigidly to the shaft 77 and is preferably split and secured to the shaft by a clamp bolt 81, the hub having a gear housing 82 and also a gear housing 83 rigidly and preferably integrally connected thereto, the housings being also connected together preferably by an integral web 84, the housing 82 inclosing the gear wheel 76. A counter shaft 85 is rotatively journaled in the web 84 between the two housings 82 and 83, and has a pinion 86 secured rigidly thereto that engages the gear wheel 76, a gear wheel 87 being secured also to the countershaft 85 in the housing 83. A journal box 88 is formed on the housing 83 in connection with the web 84 and has a cutter shaft 89 mounted rotatively therein, a pinion 90 being secured to the shaft 89 in the housing 83 and in engagement with the gear wheel 87, and a disk shaped cutting knife 91 is secured to the inner end of the shaft 89 at the exterior of the housing 83, so that if the shaft 77 be rotated it will carry the housings 82 and 83 around and bring the cutting knife into contact with a shear-blade as 22' of the turn-table arm that may be in proper position adjacent to the housing 2; the housing 83 will move in the direction indicated by the arrows in Fig. 7 and the gear wheels and cutting knife will rotate in the directions of the arrows thereon, especially as seen in Figs. 4 and 5.

A trip arm 92 has a finger 93 and is supported on the inner side of the housing 2 by means of the pivot 93′, the trip arm having also a shoulder 94 between the finger 93 and the pivotal support of the arm, the shoulder facing toward the finger 93. The arm 92 extends along one side of the housing 83 and the housing has a projection 95 on its side adapted to engage the finger 93 to lift the arm, and adapted also to engage the shoulder 94 to prevent backward movement of the housing when the cutting knife is at rest position. At the lower portion of the forward end of the platform 1 or adjacent to the bottom of the housing 2 is a horizontal rock shaft 96 suitably supported and having a rearward extending arm 97 thereon that is connected by a chain or cord 98 which is connected to the free end of the arm 92, the end of the arm having also a chain 98′ connected thereto, the chain being connected also to the housing to limit the downward movement of the trip arm when not engaged by the projection 95. The rock shaft 96 has also an arm 99 secured thereto that stands opposite to the outer end of either feed bar 37 or 37′ when in operative position, and the arm 99 is pressed forcibly against the feed-bar by a spring 100 that is suitably connected to the rock-shaft 96. A chute 101 is arranged in the housing 2 onto which the sliced meat will fall and from which the meat may be drawn onto wrapping paper or other suitable container.

A modified form of gearing is illustrated in Fig. 28 for operating the cutting-knife, and comprises a stationary sprocket wheel 76′ that is substituted for the toothed gear wheel 76, and a sprocket wheel 86′ is substituted for the pinion 86, the two sprocket-wheels being connected by a sprocket chain 102 that causes the sprocket-wheel 86 to rotate when the housing 83 is carried about the shaft 77; and a sprocket-wheel 87′ is substituted for the toothed gear wheel 87, a sprocket wheel 90′ being substituted for the pinion 90, the sprocket-wheels 87′ and 90′ being connected by a sprocket chain 103. In some cases it may be desired to modify the cutting apparatus further, and a crescent shaped cutting-knife 104 may be secured directly to the shaft 77 to be moved thereby in connection with the stationary shear-blade of either arm of the turn-table, the shaft 77 having an arm 95′ secured thereto to engage the finger 93 and the shoulder 94 of the arm 92. In order to maintain the disk shaped cutting knife in keen condition the housing 83 is provided with a lug 105 to which is connected an arm 106 having a holder 107 on its end in which a grinding stone 108 is arranged movably opposite to the beveled edge of the cutting-knife and pressed thereto by a spring 109 that is mounted on the arm 106, the arm 106 being removable when desired.

It will be understood that various modifications in construction may be fairly made within the scope of the appended claims, as for instance the turn-table may be adapted to support any convenient number of pieces of meat, and the meat supporting and guiding portions of the turn-table need not necessarily be formed as arms, although the construction described in detail may be preferable in the interest of lightness in weight of structure, being adapted to be formed largely of sheet metal.

In practical use each pallet may have a particular kind of meat attached thereto and if desired they may be kept in refrigerators or elsewhere conveniently when the machine is not desired to be used, and as will be apparent the pallets may be readily placed upon the arms in connection with the feed heads or replaced by others without delay. When the handle 20 is moved in the direction from the housing 2 or rearward the turn-table may be freely turned by hand, so as to bring either arm thereof into proper position to be moved toward the housing 2, and then the handle 20 may be moved forward, which will cause the turn-table to be moved bodily toward the housing 2 until the guide fingers 73 and 73′ are brought into engagement with the V-shaped guides 72 and 72′ and stopped thereby, the springs 6 and 14 yielding slightly but holding the guide fingers firmly against the bottoms of the V-shaped guides so that the stationary shear-blade as 22′ will be accurately positioned with respect to the plane of the movable cutting-knife. When the handle 79 is moved so as to move the cutting-knife in the proper direction the cutting-knife will pass around the shaft 77 and past the stationary shear-blade and be carried into the upper portion of the housing, and after the slice of meat has been cut off the projection 95 will engage the finger 93 and also the shoulder 94, indicating the position of rest if it is desired to stop operations, and then when moving the cutting knife to cut another slice off, the projection 95 will raise the arm 92 and therefore operate the arm 99 through its connections and push it rearward, thus retracting the feed-bar 37. After the projection 95 passes the finger 93 the arm 92 will again descend and permit the spring 41 to project the feed-bar 37, which will be gripped by the grip-arm 46 and therefore drag the feed-head 42, so as to move the pallet and the meat thereon forward, all of which will occur before the cutting knife comes into contact with the meat, similar operations being repeated with each revolution of the shaft 77. If it be desired to vary the thickness of the slices this may be done by readjusting the adjusting screw 35, so as to shift the wedge 33 to vary the extent of the forward movement of the feed-bar. In case it be desired to cut a relatively thick portion from the piece of bulk meat the pallet may be slightly tilted so that the spring 51 will be relieved of pressure and avoid causing contact of the grip arm 46 with the feed-bar, and then the feed-head and pallet may be freely moved as far forward as may be desired. Other operations will be apparent and readily understood from the foregoing description in detail.

The machine, as will be apparent, is particularly adapted to be operated by hand power applied to the crank-arm 78 which is of advantageous length to afford ample power, the handle 79 being much farther away than the effective portion of the cutting knife from the crank shaft 77 around which the knife is carried. The cutter shaft 89 is arranged relatively close to the shaft 77 so that the knife may be easily forced through the meat or other substance, and as will be seen the connected housings 82 and 83 constitute an arm which, with the compound cutter gearing carried thereby, being at one side of the shaft 77, affords unbalanced weight wherein energy is stored during part of the revolution of the shaft 77 before the knife acts, to be given out while the knife is in action on the meat, with the knife rotating at high speed relatively to the crank-arm, the result being that the cutting is effected easily by hand power.

Having thus described the invention, what is claimed as new, is—

1. A slicer including a horizontal platform, an upright hollow housing at one end of the platform, a guide on the platform, a clamp mounted on the guide, a drive shaft mounted rotatably in the hollow housing and having a cutter-arm secured thereto within the housing and constituting two connected gear-housings rotatable with the drive shaft, the two gear-housings having a connected train of gear-wheels mounted rotatably therein, a disk-cutter rotative on the cutter-arm and operatively connected with the train of gear-wheels, a crank-arm on the drive shaft at the outer side of the hollow housing, and means for actuating the train of gear-wheels on rotation of the drive-shaft.

2. A slicer including a platform, an upright hollow housing on one end of the platform, a drive shaft mounted rotatably in the hollow housing, a cutter-arm secured to the shaft in the housing, driving means on the shaft at the outer side of the housing, a disk-cutter rotative on the cutter-arm, means for rotating the disk-cutter on rotation of the drive shaft, a guide mounted on the platform, a feed-head movable on the guide, feeding mechanism for the feed-head, a trip device mounted in the hollow housing, means connected with the trip device for coöperation with the feeding mechanism, and means carried by the drive shaft for periodically engaging the trip device.

3. A slicer including a platform, an upright hollow housing on one end of the platform, a drive shaft mounted rotatably in the housing, a cutter-arm secured to the shaft within the housing, a main gear-wheel extending about the shaft and mounted fixedly on the inner side of the housing, a counter-shaft mounted rotatably in the cutter-arm and having a pinion secured to one end and a counter-gear wheel secured to the opposite end thereof, the pinion being connected operatively with the main gear-wheel, a cutter-shaft mounted rotatably in the cutter-arm, a pinion secured to the cutter-shaft and connected operatively with the counter-gear wheel, a disk-cutter secured to the cutter-shaft adjacent to the cutter-arm, a device on the drive shaft at the outer side of the housing for rotating the shaft, a turn-table mounted rotatably on the platform and having a plurality of guides thereon, feed-heads mounted movably on the guides, one on each guide, and means for preventing rotation of the turn-table.

4. A slicer and cutter including a platform, an upright hollow housing on one end of the platform and having a drive shaft mounted horizontally and rotatably therein, a crank-arm on the drive shaft outside the housing, a cutting knife carried by the drive shaft in the housing, a turntable mounted rotatively on the platform and movable horizontally toward or from the plane of the knife and having a plurality of guides thereon, feed-heads mounted movably on the guides, one on each guide, means for moving the turntable horizontally, and means for guiding and preventing rotation of the turntable when moved toward the plane of the knife.

5. A slicer and cutter including a platform and an upright hollow housing on one end of the platform constituting a main frame, the housing having a drive shaft mounted horizontally and rotatably therein, a crank-arm on the drive shaft outside the housing, a cutting knife carried by the drive shaft in the housing, a turntable mounted rotatively on the platform and movable horizontally toward or from the plane of the knife and having a plurality of longitudinal guides arranged radially thereon, feed-heads mounted movably on the guides, one on each guide, independent feeding mechanism for each feed-head, mechanism mounted on the frame to be actuated for coöperating with the feeding mechanisms separately, means for moving the turntable horizontally, and means for guiding the turntable when moved toward the plane of the knife.

6. A slicer and cutter including a main frame, a cutting knife mounted on the frame and movable in one plane, a turntable mounted rotatively on the frame and having radially-disposed guides thereon, means for shifting the axis of the turntable toward or from the plane of the knife, feed-heads mounted on the guides, one on each guide, each feed-head being provided with a grip-arm, feed-bars mounted movably on the turntable, one for each feed-head, the feed-bars coöperating with the grip-arms when moved in one direction to move the feed-heads, means for adjusting the amount of movement of the feed-bars, springs mounted on the turntable and engaging the feed-bars to move the feed-heads, an arm mounted movably on the frame to separately engage and retract the feed-bars, and means for moving the arm.

7. A slicer and cutter including a main frame, a cutting knife mounted on the frame and movable in one plane, a turntable center-post mounted on the frame and having its axis movable toward or from the plane of the cutting knife, a turntable mounted rotatively on the post and movable with the movable axis toward or from the plane of the cutting knife, the turntable having a plurality of longitudinal guides thereon, feed heads mounted movably on the guides, one on each guide, clamping bars carried by the feed heads, independent feeding mechanism for each feed head, and mechanism mounted on the frame to be actuated for coöperating with the feeding mechanisms separately.

8. A slicer and cutter including a frame, a cutting knife mounted on the frame and movable in one plane, a pair of journal-bearings mounted movably in the frame and spring-pressed toward the plane of the cutting knife, a turntable center-post having offset journals that are mounted rotatively in the journal bearings, a turntable mounted rotatively on the center-post and movable thereby toward or from the plane of the cutting knife and having a plurality of longitudinal guides thereon, feed heads mounted movably on the guides, one on each guide, clamping bars carried by the feed-heads, a plurality of shear blades mounted fixedly on the turntable at the ends of the guides, one for each guide and movable by the turntable separately to the plane of the cutting knife, and independent feeding mechanism for each one of the feed heads.

9. A slicer and cutter including a frame, a cutting knife mounted on the frame and movable in one plane, means for operating the cutting knife, a meat-supporting guide mounted on the frame and having a housing connected thereto that is provided with a guide bar, a wedge mounted adjustably on the guide bar, means for adjusting the wedge, a feed head mounted movably on the meat-supporting guide and provided with a grip-arm, the feed head comprising a pallet, a clamping bar mounted adjustably on the pallet, a feed-bar mounted movably on the meat-supporting guide and normally engaging the wedge, the feed-bar also engaging the feed head and coöperating with the grip-arm when moved in one direction to move the feed head, a spring mounted in the housing and adapted to move the feed-bar to move the feed head, a shear blade mounted on the meat-supporting guide adjacent to the plane of the cutting knife, an arm mounted movably on the frame to retract the feed-bar, and devices connected with the arm to be actuated by the means for operating the cutting knife.

10. A meat slicer and cutter including a frame, a meat-supporting guide mounted on the frame, a shear blade supported at an end of the meat-supporting guide, a feed-bar mounted movably on the meat-supporting guide and spring-pressed in one direction, a feed head mounted movably and guided by the feed-bar and the meat-supporting guide and having a grip-arm pivoted thereto, a spring engaging the feed head and the grip-arm to force the grip-arm into contact with the feed-bar for moving the feed head, a rock-shaft mounted on the frame and having an arm extending opposite the end of the feed-bar, a spring for forcing the arm into contact with the feed-bar to retract the feed-bar, an operating arm on the rock-shaft, a trip arm mounted on the frame and connected with the operating arm, a driving shaft mounted rotatively on the frame and carrying a device for periodically engaging the trip arm, and a cutting knife carried by the driving shaft in a plane adjacent to the shear blade.

11. A meat slicer and cutter including a frame, a cutting knife mounted on the frame and movable in a plane, a turntable comprising a plurality of arms and mounted rotatively on the frame, each arm constituting a meat-supporting guide and having a shear blade mounted on its end, means for shifting the axis of the turntable toward or from the plane of the cutting knife, and means for guiding and stopping the turntable to position the shear blade of either one of the arms adjacently to the plane of the cutting knife.

12. A slicer and cutter including a horizontal platform and an upright housing at one end of the platform constituting a main frame, a journal box mounted on the platform, frame members attached to the housing and extending above the platform, a journal box supported on the frame members, a vertical turntable center-post having offset journals that are mounted rotatively in the journal boxes whereby to shift the axis of the center-post toward or from the housing, a turntable mounted rotatively on the center-post in a horizontal plane and having a plurality of longitudinal guides arranged radially thereon, the turntable having also a plurality of guiding devices thereon, feed heads mounted movably on the guides, one on each guide, feeding mechanism for each feed head, a cutting knife mounted in the housing and movable in a plane intersecting the plane of rotation of the turntable, and a guiding device mounted fixedly on the frame to be engaged by either one of the guiding devices of the turntable.

13. A slicer and cutter including a platform and an upright hollow housing at one end of the platform constituting a main frame, a drive shaft mounted horizontally and rotatably in the housing, two gear-housings connected rigidly together side-by-side and secured to the shaft within the housing, a gear-wheel extending about the shaft and mounted fixedly on the inner side of the housing, a counter-shaft mounted rotatably in the two gear-housings and having a pinion secured to one end thereof in the outer one of the gear-housings and a counter-gear wheel secured to the opposite end thereof in the inner one of the two gear housings, the pinion being in contact with the fixedly-supported gear-wheel, a cutter-shaft mounted rotatably in the inner one of the gear-housings, a pinion secured to the cutter-shaft in the inner one of the gear-housings and in contact with the counter-gear wheel, a disk-cutter secured to the cutter-shaft adjacent to the inner one of the gear-housings, a crank-arm rigid on the drive shaft at the outer side of the hollow housing, a guide mounted on the platform, and a clamp mounted on the guide.

14. A slicer and cutter including a horizontal platform and an upright hollow housing at one end of the platform constituting a main frame, a turntable center-post mounted on the platform and having its axis movable toward or from the housing, a turntable mounted rotatively on the center-post to be moved bodily thereby and having a plurality of guides thereon, means for moving the axis of the center-post, feed-heads mounted movably on the guides, one on each guide, clamping bars carried by the feed-heads, means for guiding the turntable when moved bodily toward the housing, independent feeding mechanism for each feed-head, a drive shaft mounted rotatably in the hollow housing, a cutter-arm secured to the shaft in the housing, a crank-arm on the shaft at the outer side of the housing, a disk-cutter rotative on the cutter-arm, means for rotating the cutter on rotation of the drive shaft, a rock-shaft mounted on the frame and having an arm to coöperate with either one of the feeding mechanisms, a trip-arm mounted in the hollow housing and connected with the rock-shaft, and means carried by the drive shaft for periodically engaging the trip-arm.

15. A slicer and cutter including a frame, a cutting knife mounted on the frame to move in a plane, a meat-supporting guide mounted on the frame and extending longitudinally nearly to the plane of the cutting knife at an angle thereto, a feed-bar mounted movably on the meat-supporting guide, a feed head mounted on the feed-bar in engagement with the guide and having a socket and also an aperture therein, the feed head having a pallet removable thereon provided with a lug extending into the socket, a clamp bar mounted on the pallet, a grip-arm pivoted to the feed head and adapted to be moved into engagement with the feed-bar, a spring engaging the grip-arm and the feed head to prevent engagement of the grip-arm with the feed-bar, a relatively stronger spring engaging the grip-arm and extending through the aperture into engagement with the pallet to move the grip-arm into engagement with the feed-bar, a spring to move the feed-bar in one direction, and means for moving the feed-bar in the opposite direction.

In testimony whereof, I affix my signature in presence of two witnesses, on the 21st day of December, 1908.

JOHN WINKELMEYER.

Witnesses:
  C. E. LEE,
  HAILEY N. BURNIE.